US006848524B2

(12) United States Patent
Vaillancourt et al.

(10) Patent No.: US 6,848,524 B2
(45) Date of Patent: Feb. 1, 2005

(54) ADJUSTABLE AIR VENT FOR A VEHICLE

(75) Inventors: Claude Vaillancourt, St-Elie-d'Orford (CA); Ghyslain Bordeleau, Valcourt (CA); Caroline Charbonneau, Canton de Hatley (CA); Jean-Pierre Boyer, L'Islet sur Mer (CA)

(73) Assignee: Bombardier Recreational Products Inc., Valcourt (CA)

( * ) Notice: Subject to any disclaimer, the term of this patent is extended or adjusted under 35 U.S.C. 154(b) by 351 days.

(21) Appl. No.: 10/174,567

(22) Filed: Jun. 19, 2002

(65) Prior Publication Data

US 2002/0153182 A1 Oct. 24, 2002

Related U.S. Application Data

(63) Continuation of application No. 09/689,788, filed on Oct. 13, 2000, now Pat. No. 6,439,328.
(60) Provisional application No. 60/178,776, filed on Jan. 28, 2000, and provisional application No. 60/160,761, filed on Oct. 21, 1999.

(51) Int. Cl.[7] .............................................. B62D 27/00
(52) U.S. Cl. .................. 180/68.1; 180/69.2; 180/69.24; 165/98; 49/38; 123/41.58
(58) Field of Search ............................... 180/68.1, 68.2, 180/68.4, 69.2, 69.21, 69.24; 406/113; 123/41.56, 41.58; 49/74.1, 38, 39, 68; 165/98, 41

(56) References Cited

U.S. PATENT DOCUMENTS

| 104,717 A | 6/1870 | Eich |
| 669,596 A | 3/1901 | Ridgway |
| 1,254,785 A | 1/1918 | Farrell |
| 1,486,012 A | 3/1924 | Christy |
| 1,521,362 A * | 12/1924 | Dunlap ........................... 49/38 |
| 1,638,847 A | 8/1927 | Hansen |
| 2,133,924 A | 10/1938 | Petersen et al. |
| 2,708,869 A | 5/1955 | Grossenbacher et al. |
| 3,120,797 A | 2/1964 | Beyer |
| 4,008,777 A | 2/1977 | Juto et al. |
| 4,249,626 A | 2/1981 | Fields et al. |
| 4,410,032 A | 10/1983 | Mori |
| 4,676,145 A * | 6/1987 | Allred ......................... 454/276 |
| 4,706,461 A | 11/1987 | Pratt et al. |
| 4,850,444 A | 7/1989 | Bojanowski et al. |
| 4,892,164 A | 1/1990 | Yasui et al. |
| 5,129,473 A | 7/1992 | Boyer |
| 5,152,365 A | 10/1992 | Aoshima |
| 5,155,936 A | 10/1992 | Johnson |
| 5,251,718 A * | 10/1993 | Inagawa et al. ............. 180/190 |
| 5,950,753 A | 9/1999 | Muldoon et al. |
| 6,109,217 A | 8/2000 | Hedlund et al. |
| 6,216,809 B1 | 4/2001 | Etou et al. |
| 6,439,328 B1 * | 8/2002 | Vaillancourt et al. ....... 180/68.1 |

FOREIGN PATENT DOCUMENTS

JP 2-274681 A 2/1990

* cited by examiner

*Primary Examiner*—Christopher P. Ellis
*Assistant Examiner*—J. Allen Shriver
(74) *Attorney, Agent, or Firm*—BRP Legal Services

(57) ABSTRACT

In a snowmobile or other vehicle, ventilation of ambient air to the engine compartment is necessary. However, from time to time when encountering deep snow or extremely cold temperatures, it may be necessary to restrict the inflow of ambient air into the engine compartment. An adjustable air vent having a sliding ventilation grill adjusts the air flow. The air vent has actuators for adjusting the air flow that are simple and easily manually operable by an operator even when wearing gloves or mittens without the need of any tools.

13 Claims, 8 Drawing Sheets

US 6,848,524 B2

ADJUSTABLE AIR VENT FOR A VEHICLE

CROSS REFERENCE TO RELATED APPLICATION

This application is a continuation of U.S. application Ser. No. 09/689,788, filed Oct. 13, 2000 now U.S. Pat. No. 6,439,328, which claims priority to U.S. Application 60/178,776, filed Jan. 28, 2000 and U.S. Application 60/160,761, filed Oct. 21, 1999, the entire contents of all three applications hereby incorporated by reference.

BACKGROUND OF THE INVENTION

1. Field of the Invention

This invention relates to ventilation systems for vehicles, and in particular, to adjustable air vents for snowmobiles for adjusting an amount of ambient air permitted to flow into engine compartments of the snowmobiles.

2. Description of the Related Art

Recreational vehicles and more particularly snowmobiles, generally operate in cooler ambient temperatures. As such, air cooled engines (usually 2 cycle) are often used as a power source. In some newer models of snowmobiles, liquid cooled engines (either 2-cycle or 4 cycle) having heat exchangers are also used. It is generally necessary to have an inflow of air (called "ram air") into the engine compartment to either cool the heat exchanger for the liquid cooled engine or to flow pass and remove heat from the cooling fins of the air cooled engine.

It has been found, however, that when the snowmobile operates at extremely cold temperatures, the engine can be so overcooled by the inflow of ram air, that its efficiency decreases. Furthermore, when operating in deep snow, snow may enter through the ventilation openings into the engine compartment and again overly cool the engine or adversely affect other mechanical systems. For instance, the snow can contact hot surfaces of the engine and melt or turn to steam. The melted snow or steam can then come into contact with cold surfaces and refreeze. The resulting buildup of ice can prevent proper operation of the vehicle systems, including, for example, the torque converter.

Thus, there is a need to have adjustable ventilation vents that can be quickly and easily opened and closed by an operator without tools and preferably, while wearing gloves or mittens, during different conditions of operation.

Sliding-type air vents are known in the prior art. See for instance, Hansen, U.S. Pat. No. 1,638,847, issued Aug. 16, 1927. Hansen discloses a shutter for an automobile radiator having a first plate 10 with a plurality of slots 14 and a second plate 18 having a like number of slots 19. The two plates are slidably engaged with one another to allow plate 18 to be moved from a first position, where the slots 14 and the slots 19 are aligned and air can pass therethrough, to a second position, where the slots 14 and the slots 19 are not aligned and air does not flow therethrough. The sliding plate 18 is actuated via a remote pin 35 mounted to the automobile dashboard through actuating wires 31 and 32 positioned in tubes 33 and 34.

Pratt, U.S. Pat. No. 4,706,461, issued Nov. 17, 1987, discloses a similar sliding air vent. Pratt uses a thermoelongating actuator 82 mounted to levers 74 and 76 mounted between the stationary and slidable grills to vertically move the slidable grill to an opened or closed position, as desired.

However, neither of these prior art devices is simple enough or easily manually operated by an operator wearing gloves or mittens so as to be applicable to use in a recreational vehicle, and especially a snowmobile.

SUMMARY OF THE INVENTION

It is an object of the present invention to provide a simple, inexpensive cooling air flow control device for a vehicle, and particularly a snowmobile, that is easily manually operable by an operator without tools, even when the operator is wearing gloves or mittens.

Therefore, this invention provides an adjustable air vent for a vehicle. The air vent includes a stationary grill adapted to be mounted to the vehicle, the stationary grill having at least one air aperture and an engaging surface. In addition, a movable grill is adapted to be movably mounted with respect to the stationary grill. The movable grill has at least one air aperture and an engaging surface adapted to engage the engaging surface of the stationary grill. The movable grill moves with respect to the stationary grill from an open position where the at least one aperture of the stationary grill is aligned with the at least one aperture of the movable grill to allow air to flow therethrough to a closed position where the at least one aperture of the stationary grill is not aligned with the at least one aperture of the movable grill to reduce the flow of air through the vent.

The stationary grill also includes a projecting closing actuator and a projecting opening actuator. The movable grill includes a projecting closing actuator positioned proximate the stationary grill projecting closing actuator such that squeezing the two together moves the movable grill to the closed position. The movable grill also includes a projecting opening actuator positioned proximate the stationary grill projecting opening actuator such that squeezing the two together moves the movable grill to the open position.

In a preferred embodiment of the present invention, a plurality of the adjustable air vents are fixed to an underside of a snowmobile hood. The provision of the actuators that can be easily manipulated by squeezing together to open and close the vents allows the operator of the snowmobile to easily adjust cooling air flow to the engine without having to remove mittens or gloves and without using tools. Thus, the simple, easily operated vents of the present invention increase both the efficiency in adjusting the air flow and the comfort of the operator so doing.

The foregoing and other objects, features, characteristics and advantages of the present invention as well as the methods of operation and functions of the related elements of structure, and the combination of parts and economies of manufacture, will be apparent from the following detailed description and the appended claims, taken in connection with the accompanying drawings, all of which form a part of the specification, wherein like reference numerals designate corresponding parts in the various figures.

DETAILED DESCRIPTION

Figure 1:
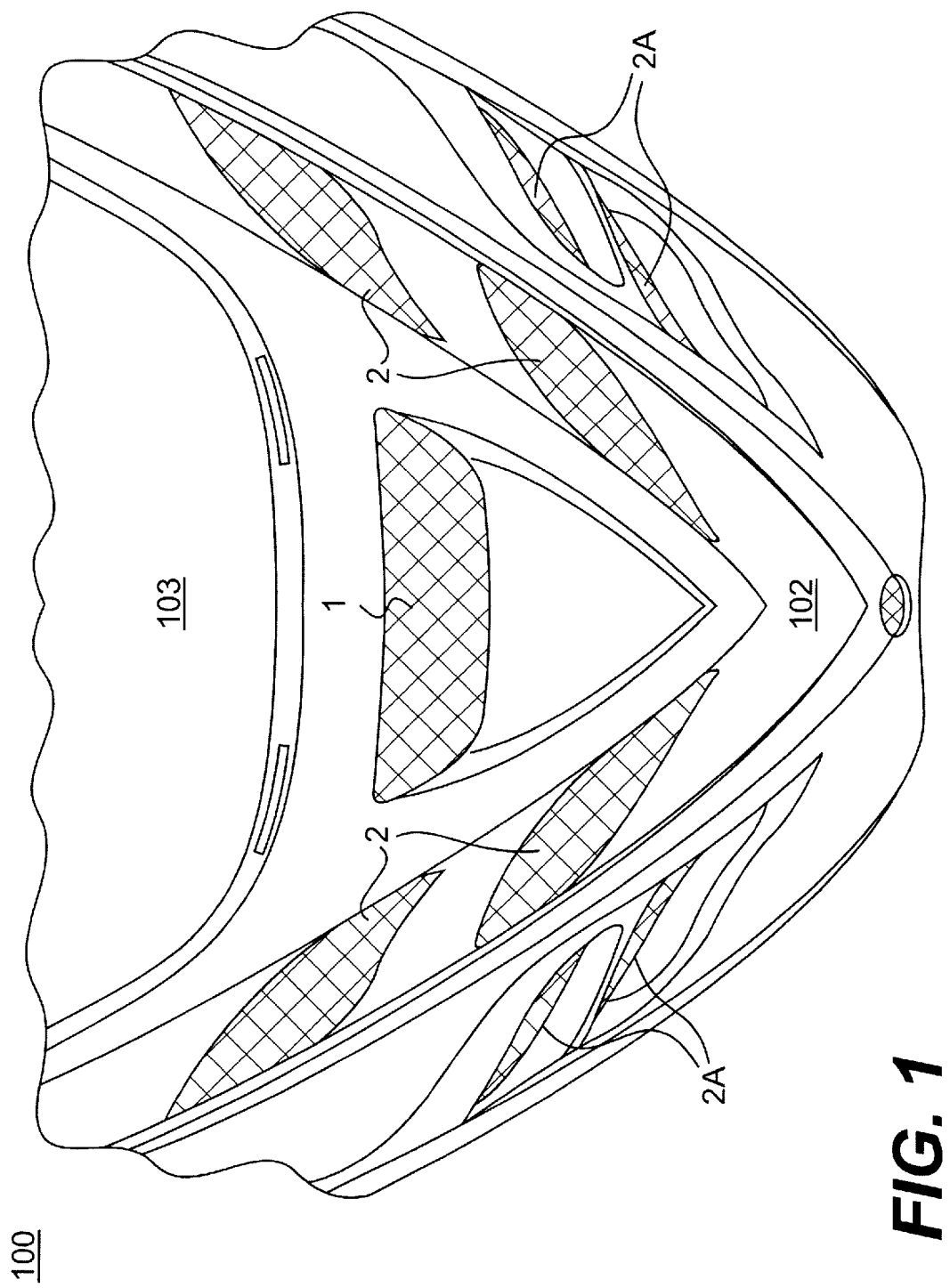
FIG. 1 is a top perspective view of a front portion of a snowmobile with the hood closed.
Figure 2:
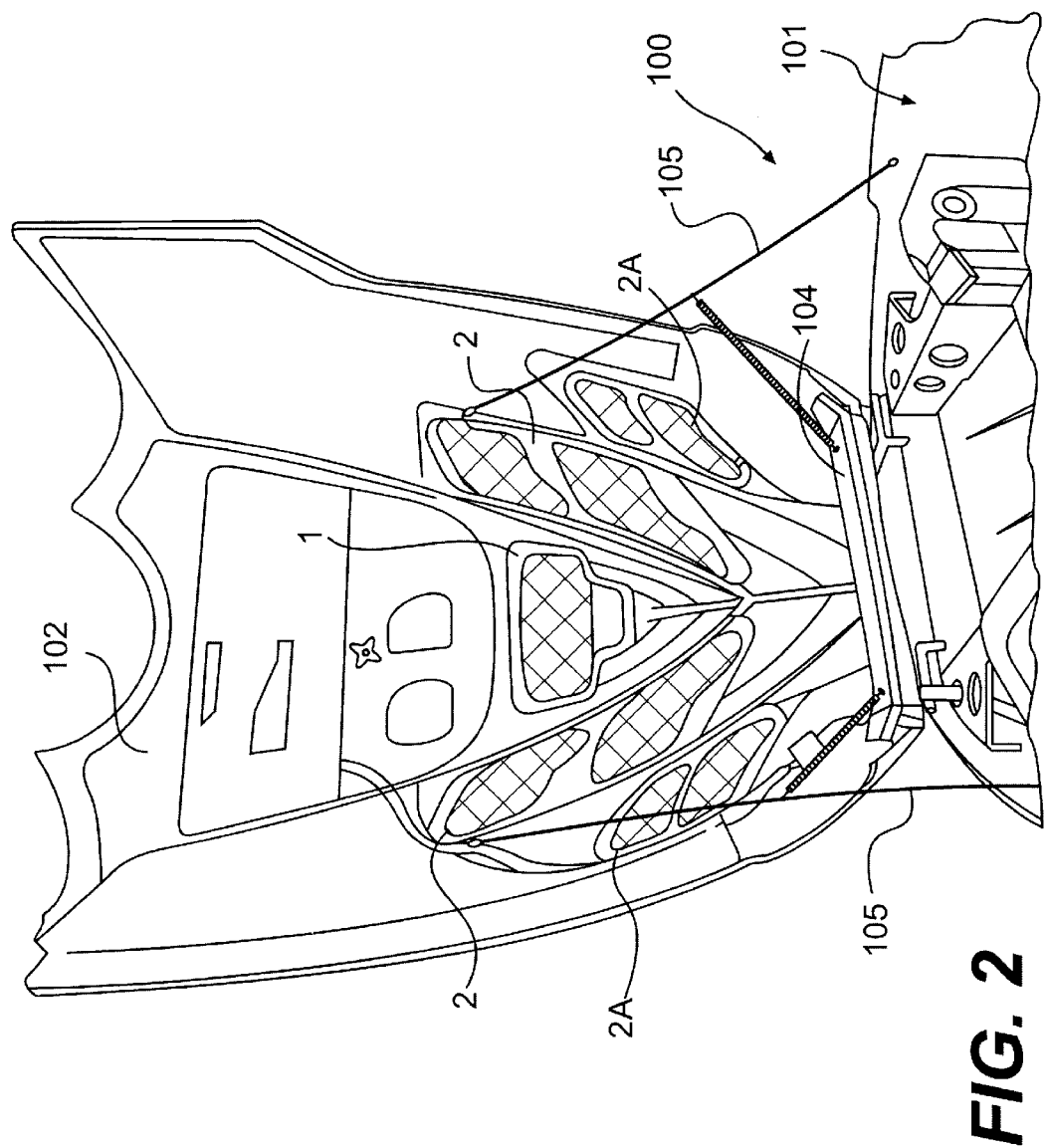
FIG. 2 is a perspective view from a rear of the snowmobile wherein the hood is in the open position.

FIG. 1 is a top perspective view of a front of a snowmobile generally shown as 100. The snowmobile includes a hood 102 and windshield 103. In FIG. 2, the same snowmobile 100 is shown, however, the view is taken from the rear left side of the vehicle.

In FIG. 2, the hood 102 is opened showing an underside of the hood 102 and a portion of an engine compartment 101. A hinge 104 connected between the hood 102 and a body of the snowmobile allows the hood 102 to be raised and lowered. Both FIGS. 1 and 2 show a large single adjustable air vent two large lateral double side vents 2, and two smaller double lateral side vents 2(A).

Figure 3:
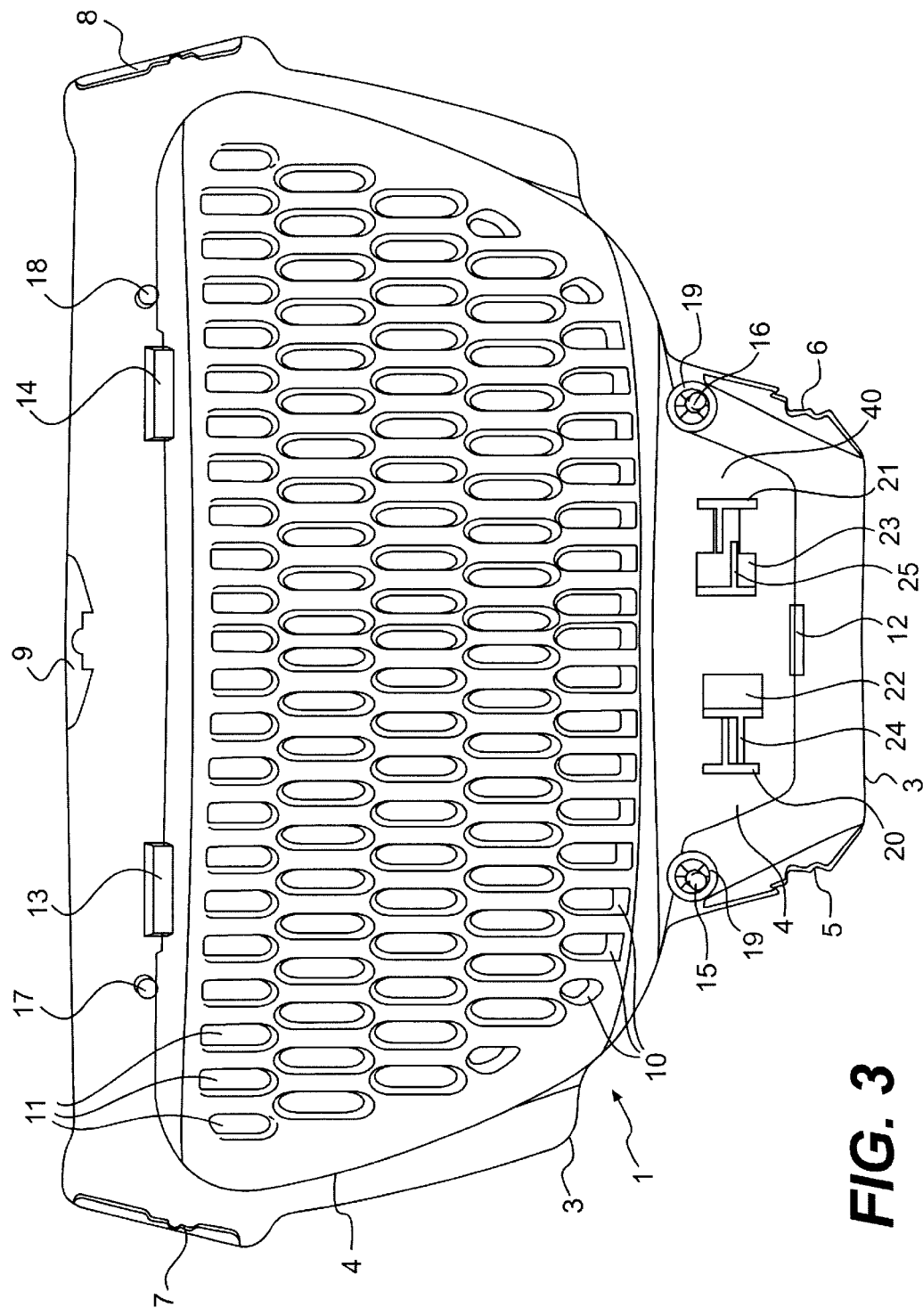
FIG. 3 is an underside view of a single sliding vent when the vent is in an open position.

In FIG. 3, a single adjustable air vent 1 is shown. The bottom of the vent shown in FIG. 3 is forward when placed under the hood 102. The air vent 1 includes a stationary grill 3 on the outer side here) and a movable or sliding grill 4 (on the inner side here). The air vent 1, and thus, the stationary grill 3 and sliding grill 4 can be shaped as necessary to conform to the contour of the hood in the desired placement location.

Stationary grill 3 is affixed to the underside of the hood 102. It is affixed by means of a left lower lateral flange 5, a right lower lateral flange 6, an upper left lateral flange 7, an upper right lateral flange 8 and an upper flange 9. These flanges are adapted to receive the heads of bolts, screws or other types of fasteners that are fixed to the snowmobile hood 102.

In FIG. 3, vent apertures 10 of the sliding grill and vent apertures 11 of the stationary grill are aligned and ambient air may pass therethrough. The sliding grill 4 is maintained in its position upon stationary grill 3 by lower slide bracket 12, left upper slide bracket 13 and right upper slide bracket 14. In addition, there are a number of guide posts, namely left lower guide post 15, right lower guide post 16, left upper guide post 17 and right upper guide post 18. The lower guide posts 15 and 16 are equipped with lock washers 19 which extend over a portion of the sliding grill 4. Alternatively, headed screws or other types of fasteners can be used to fasten to the guide posts so as to engage and secure the sliding grill to the stationary grill.

To activate the sliding grill 4, actuator projections 20 are used. There is an inner sliding grill left actuator 20 which is a T-shaped perpendicular protrusion extending outward from sliding grill 4 and, in a preferred embodiment, integrally molded thereto. In addition, there is an inner sliding grill right actuator 21 which is also a T-shaped projection which extends perpendicularly outward from the sliding grill 4 and is integrally molded thereto. The T-shape of the actuators increases the strength of the actuators and reduces the risk of breakage of the actuators.

The sliding grill 4 is also equipped with a pair of T-shaped apertures shown as left T-shaped aperture 22 and right T-shaped aperture 23. These permit perpendicular T-shaped stationary grill left actuator 24 and stationary grill right actuator 25 to extend outwardly through the inner grill, adjacent to left sliding grill actuator 20 and right sliding grill actuator 21, respectively. Alternatively, the shape of the projecting actuators and apertures can also be varied and need not be T-shaped.

In operation, when the vent is in an open position, the apertures 10 and the apertures 11 are aligned as shown in FIG. 3 to allow air to flow therethrough, and the sliding grill left actuator 20 and the stationary grill left actuator 24 have been pulled together and substantially abut one another. Aperture 22 appears to be quite open in this view. Also in the open position, the sliding grill right actuator 21 and stationary grill right actuator 25 are spaced some distance apart.

Figure 4:
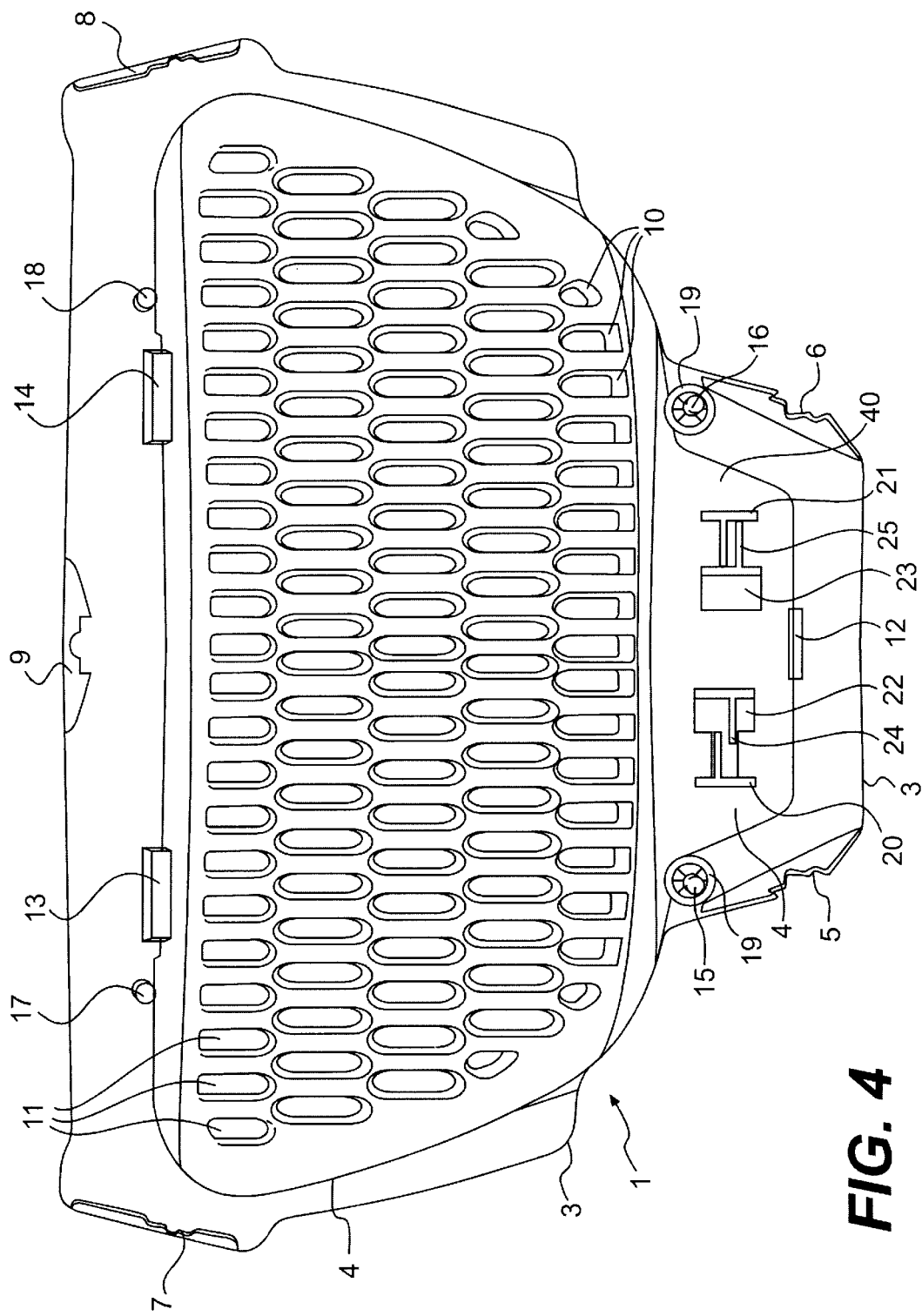
FIG. 4 is a similar view to FIG. 3 wherein the vent 5 is in a closed position.

In order to place sliding grill 4 in the closed non aligned aperture position as shown in FIG. 4, the operator simply grasps the outer sides of actuators 21 and 25 and squeezes or presses them together. In that position, as shown in FIG. 4, with actuators 21 and 25 abutting each other, the vent is closed. A locking mechanism can be provided to maintain the vent in the closed and open positions.

Figure 7:
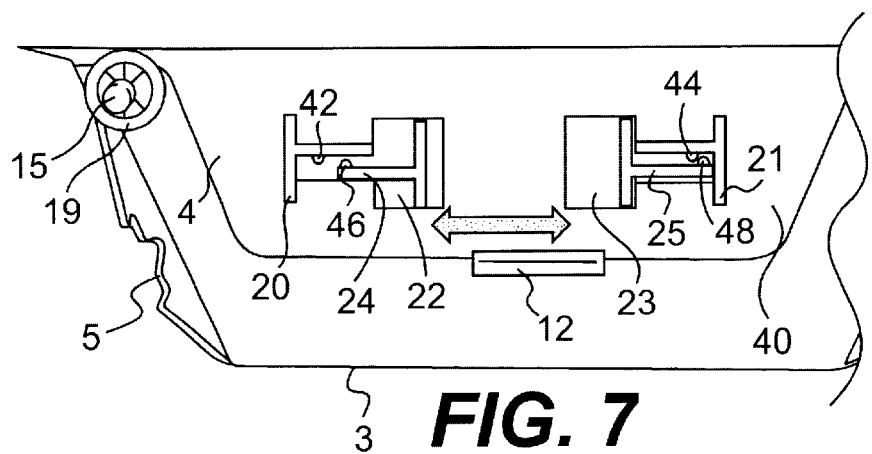
FIG. 7 is a partial view similar to FIG. 4 showing a locking mechanism for maintaining the position of the movable grill.
Figure 8:
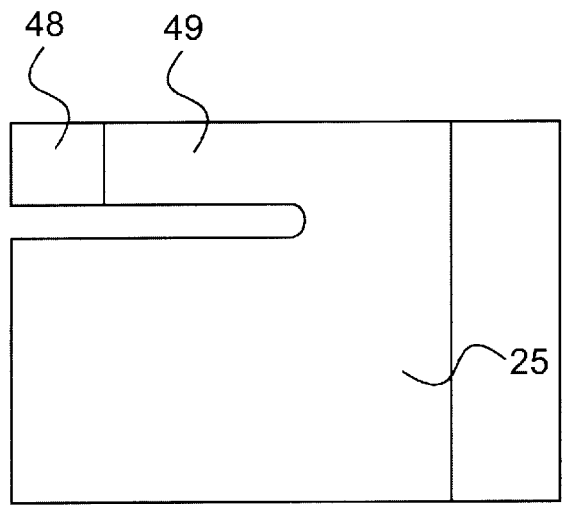
FIG. 8 is a detail view of an actuator shown in FIG. 7.

As can be seen in FIG. 7, actuators 20, 21, 24 and 25 can be provided with locking projections 42, 44, 46 and 48, respectively. As shown in FIG. 7, when actuators 21 and 25 are squeezed together, locking projection 44 will move past locking projection 48, thereby providing a positive lock to maintain the vent in the closed position. The vent will remain in the closed position until sufficient force is applied to actuators 20 and 22 to open the vent and overcome the locking force of locking projections 44 and 48. The locking projections can be molded onto the actuators. Alternatively, one or both of each corresponding pair of locking projections can be spring-loaded. See FIG. 8 where it is shown how locking projection 48 of actuator 25 is provided on an extending semi-flexible finger 49 of actuator 2S. In this way, the finger 49 provides a spring action to the locking projection 48, thereby reducing the force necessary to move the locking projections 44 and 48 relative to one another while increasing the operating life of the projections. Other spring-loading mechanisms can also be used to spring-load the projections. Similarly, locking projections 42 and 46 interact to maintain the vent in the open position. Alternative locking mechanisms can also be used.

It should be noted that in the closed position, a lower projection 40 of sliding grill 4 between guide post 15 and guide post 16 is now abutting the guide post 15 as shown in FIG. 4. This is opposed to the open position, where the lower projection 40 abuts the right hand guide post 16. Thus, guide posts 15 and 16 also act as limiting stops.

To return the sliding grill to the open position with the apertures 10 and apertures 11 aligned, the operator simply grasps the outsides of actuators 20 and 24 and squeezes or presses them together. Slide brackets 12, 13 and 14 are molded in such a manner to provided a friction fit between themselves and sliding grill 4 to help maintain the sliding grill in the desired position once adjusted. This creates a snapping-together relationship that acts similar to a locking mechanism when the movable grill is moved from a closed position to an open position and vice-versa. Alternatively, a separate friction-type or other securing mechanism can be used to maintain the sliding grill 4 in the desired position. In such a case, the fit between the slide brackets and the sliding grill could be loosened, as desired.

Figure 5:
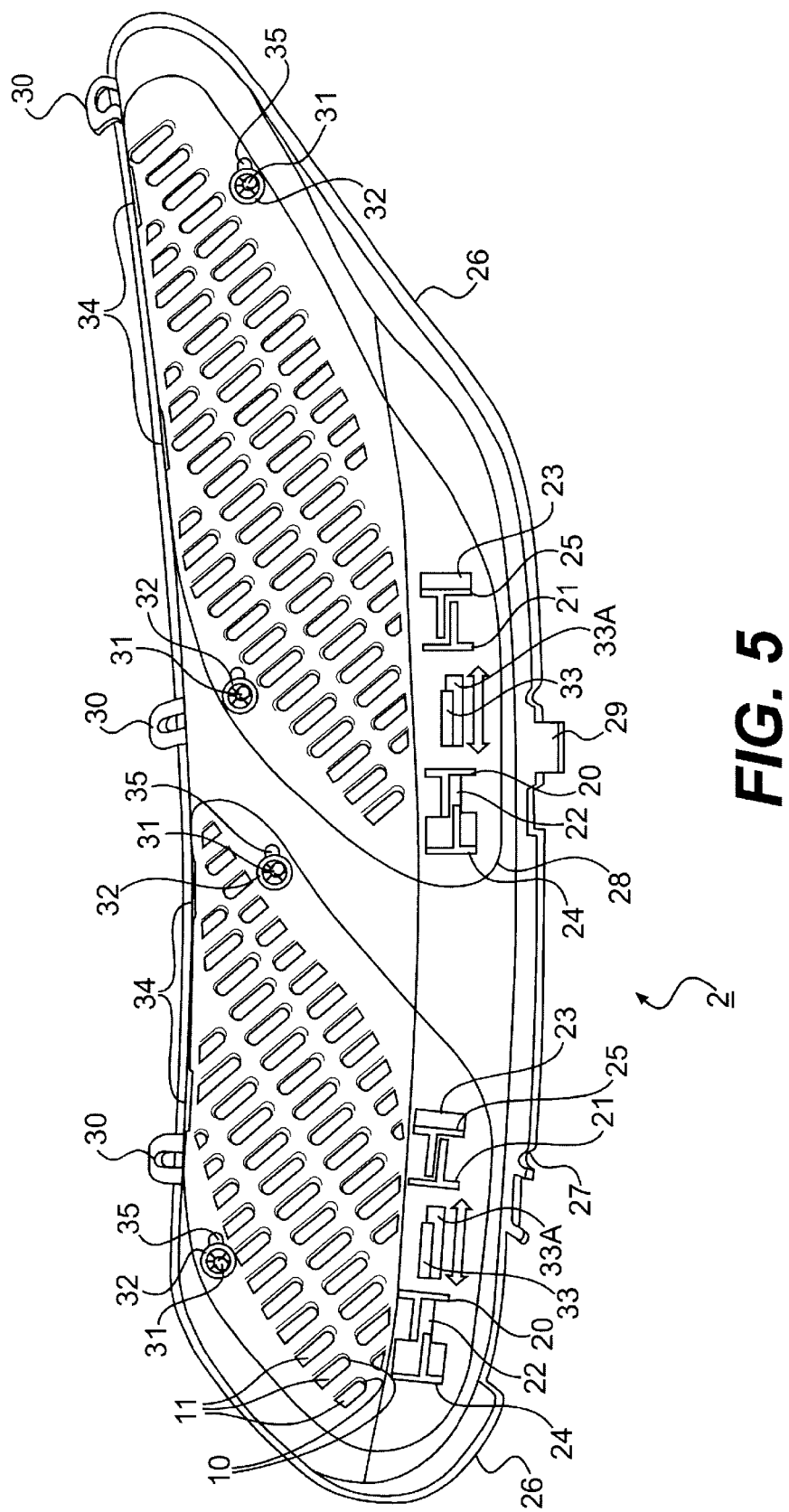
FIG. 5 is an underside view of a double-sliding vent with the vents opened.
Figure 6:
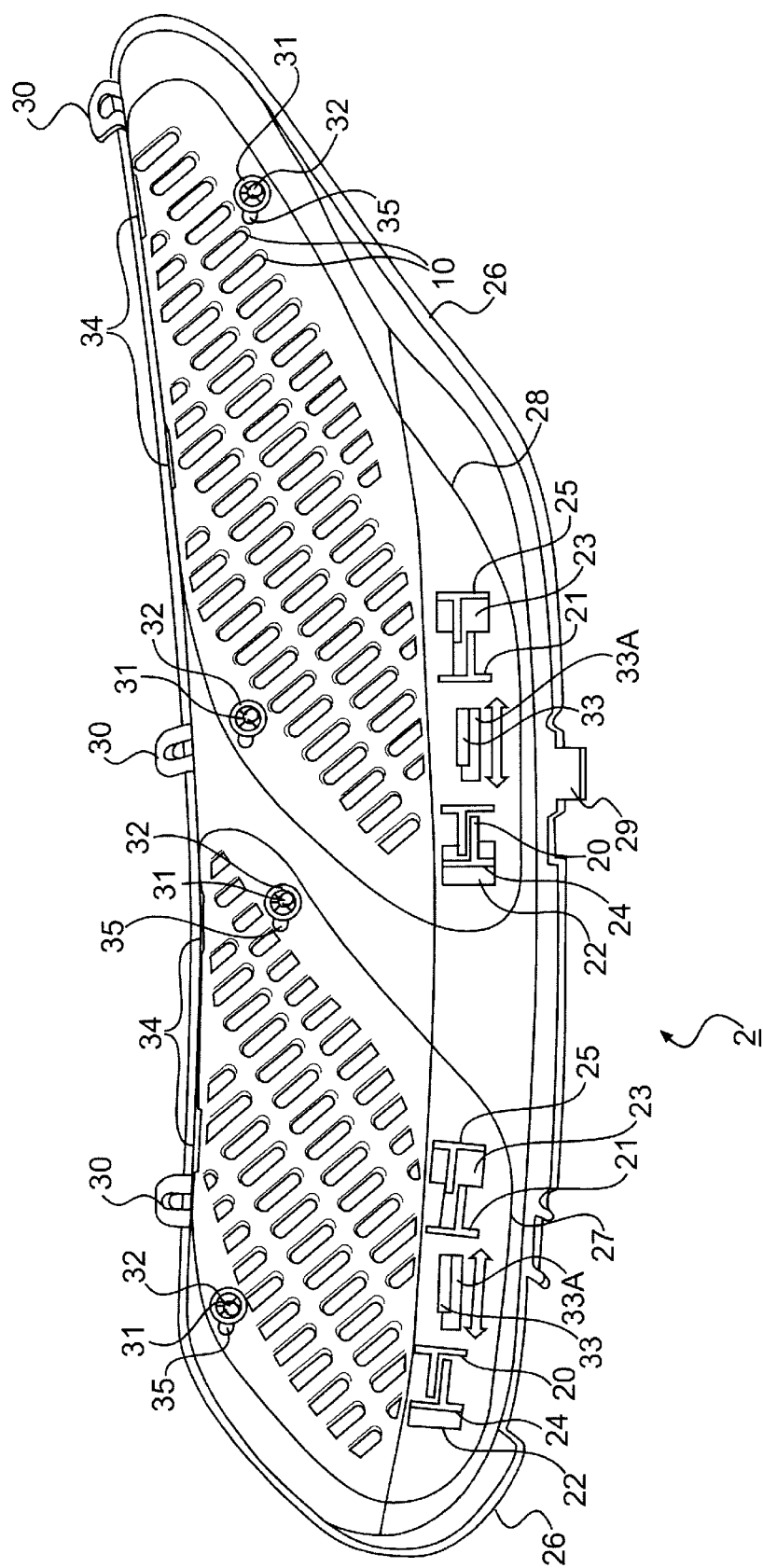
FIG. 6 is the same view of the vent shown in FIG. 5 with the vents closed.

A second embodiment of the invention is shown in FIGS. 5 and 6. The second embodiment is a double sliding adjustable air vent shown generally as 2. The actuators 20, 21, 24 and 25 function in a similar manner as the embodiment shown in FIGS. 3 and 4 with the exception that there are four pairs of such actuators. Two pairs function for each sliding grill 27 and 28. The stationary grill 26 remains one integrally molded piece.

In the embodiment shown in FIGS. 5 and 6, one of the sliding vents such as left sliding grill 27 could be closed as shown in FIG. 6, while the other remains opened as shown in FIG. 5. The stationary grill 26 shown in FIGS. 5 and 6 is fastened to the underside of the hood 102 in positions lateral of either side of the stationary grill 1. In order to fasten outer stationary grill 26 to the hood 102, a lower fastening bracket 29 is used along with three upper fastening brackets 30.

The left sliding grill 27 and right sliding grill 28 are guided for movement on stationary grill 26 by means of guide posts 31. There are two guide posts which protrude upwardly from the stationary grill 26 through elongated slots 35 which are found in the left sliding grill 27 and right sliding grill 28. Lock washers 32 secure the guide posts over the sliding grills. Springs can be placed between the lock washers and the sliding grills to provide friction for securing the sliding grills in the desired adjusted position.

Right and left sliding grills (28 and 27) are also 10 guided in place by lower slide brackets 33. These slide brackets are integrally molded to stationary grill 26 and protrude upwardly through apertures 33(A), one of which is found in the left sliding grill 27 and one in the right sliding grill 28. The upper guide brackets 34 mark the upper limits for the sliding motion of the right sliding grill 28 and left sliding grill 27. Slide brackets 33 and guide brackets 34 can be molded, as discussed above with respect to the first embodiment, to provide the desired frictional fit.

In operation, the apertures 10 and the apertures 11 are aligned in FIG. 5 and permit air to flow therethrough. In order to close the apertures, on either the right or left sides, the operator, as previously mentioned with regard to FIGS. 3 and 4, simply presses on the outsides of projecting actuators 20 and 24 on the right sliding grill 28 and left sliding grill 27 and the vents will move to the closed position or non-aligned aperture position as shown in FIG. 6. In this case, it is the apertures 35 and 33(A) in conjunction with guide posts 31 and lower slide brackets 33 that act as limiting stops.

To return the apertures of the stationary and movable grills to the open aligned position shown in FIG. 5, the operator grasps the outsides of actuators 21 and 25 and squeezes or presses them together.

Although in the preferred embodiments, the vent grills are molded from plastic, they can also be made of metal or other materials, as needs dictate.

In an alternative embodiment, one or more gaskets, liners or seals can be placed between the sliding and stationary grills and or between the grills and the snowmobile hood to provide better sealing against air flow when in the closed position and/or to reduce noise and/or wear caused by vibration between the grills. Additionally, the sliding vent need not be the inner vent but can be the outer vent. In an alternative embodiment, the vehicle hood or housing can serve as the stationary vent, with the sliding vent configured and shaped to conform to the hood/housing. In such an embodiment, a separate stationary grill need not be provided. Also, while the preferred embodiment positions one or more of the actuators in slots, such slots need not be provided, for instance, if the actuators are positioned adjacent an edge of one of the stationary and movable grills.

While the preferred embodiment uses a linear sliding motion between the sliding and stationary grills, it is also contemplated that other types of motion can be used. For instance, in one embodiment, the sliding motion can be rotary, with the sliding grill being rotatably slidable with respect to the stationary grill. In such an embodiment, the movable grill can rotate about an axis fixed with respect to the stationary grill. Two pairs of actuators can be provided at alternate positions around the axis, with one pair opening the vent when squeezed together and the other pair closing the vent when squeezed together, similarly to the operation of the preferred embodiment.

Figure 9:
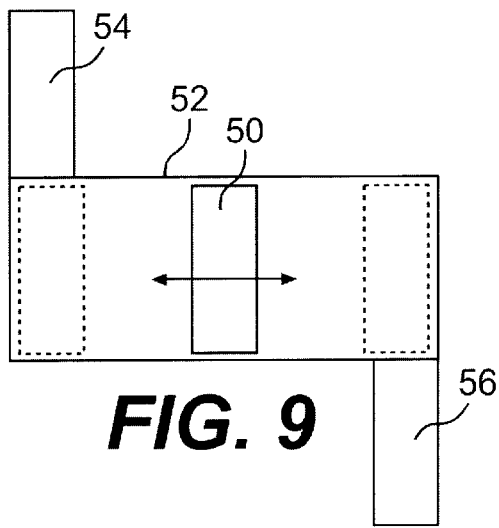
FIG. 9 is a partial view of an alternative embodiment single sliding actuator.
Figure 10:
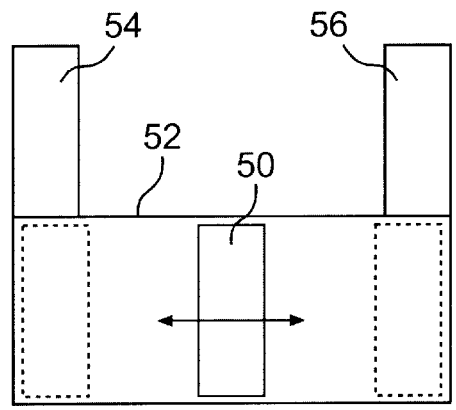
FIG. 10 is a partial view of a further alternative embodiment single sliding actuator.

In another alternative embodiment, as shown in FIG. 9, the actuators 20–24 can be replaced by a single sliding actuator 50 sliding in a slot 52 with spaced apart stationary actuators 54 and 56 positioned either at opposite diagonal corners of the slot or adjacent one side of the slot at opposite ends of the slot (see FIG. 10). In this way, the vent can be placed in one of the open and closed position by squeezing the sliding actuator 50 and the first of the stationary actuators 54 and 56 to align the sliding actuator with the first stationary actuator. The vent can then be placed in the other of the open and closed position by squeezing the sliding actuator 50 and the second of the stationary actuators 54 and 56 to align the sliding actuator with the second stationary actuator. The open and closed positions of the sliding actuator are shown in phantom in FIGS. 9 and 10.

Figure 11:
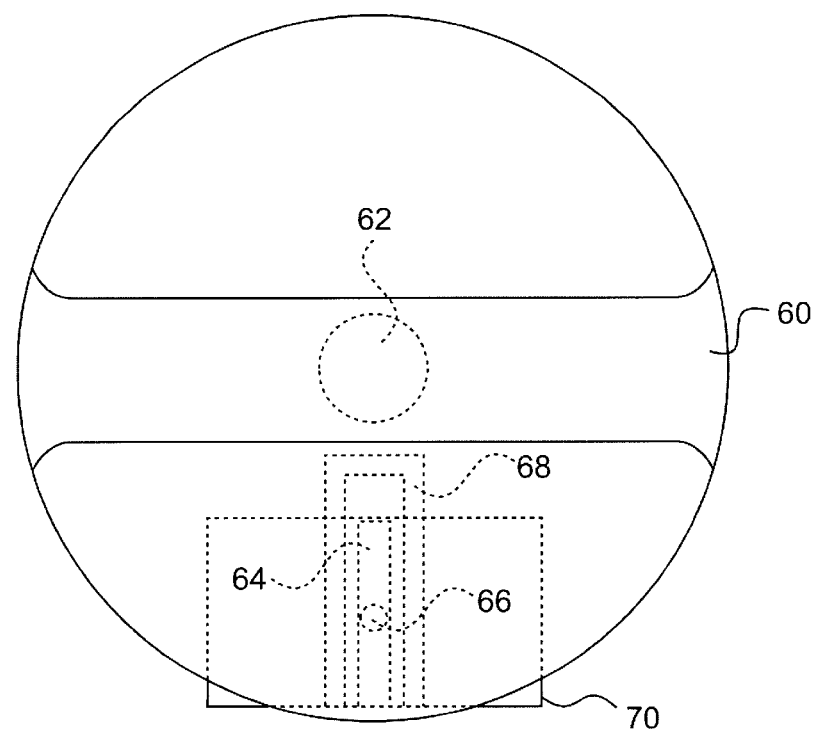
FIG. 11 is a partial view of an alternative embodiment single sliding actuator controlled by a rotary knob.

Alternatively, a manually grippable rotary knob control can be provided, interconnected between the sliding actuator and a stationary mount, to convert a rotating operating motion to the linear motion used for moving the sliding vent. FIG. 11 shows a rotary knob 60 rotationally mounted on a stationary post 62. A sliding actuator 64 is disposed in a slot 66. A cylindrical projecting portion 66 is connected to and projects above sliding actuator 64 to engage a channel 68 disposed on the underside of knob 60. By this arrangement, clockwise rotation of the knob imparts a driving force from the channel 68 to the projecting portion 66 to move the actuator 68 to the left in the slot 70, Similarly, counterclockwise rotation of the knob 60 moves the actuator 68 to the right in the slot 70.

Figure 12:
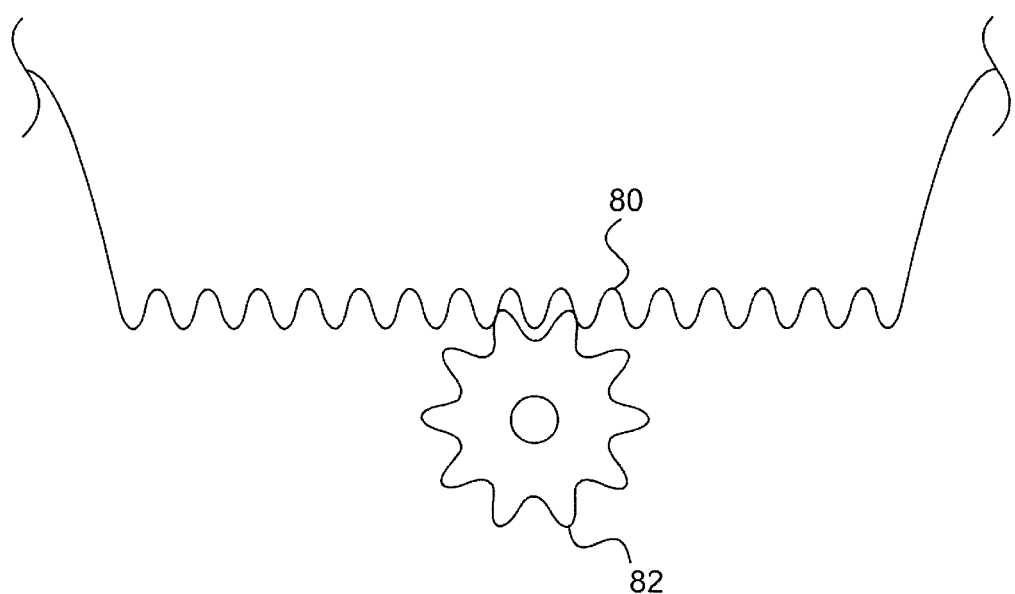
FIG. 12 a partial view of a further alternative embodiment controlled by a rotary knob.

Alternatively, a rack and pinion type arrangement can be used, as shown in FIG. 12. An edge 80 of the movable grill is toothed to engage a pinion gear 82 rotationally mounted to the stationary grill. A rotary knob (not shown) can be attached to the pinion gear to convert rotary motion to the linear motion used to move the movable grill.

In applications where an intermediate air flow is desired, one or more further actuator pairs can be provided such that squeezing the sliding actuator and the stationary actuator of the respective further pair to align the two moves the sliding grill to a position where the vent is partially open. In addition, although the preferred embodiment has a closed position where the air flow is substantially blocked, in certain applications, it may be desirable to have the closed position be one that still flows a desired minimum amount of cooling air. This can be accomplished by limiting movement of the movable grill with respect to the stationary grill so that the corresponding air flow apertures always overlap to a desired minimum extent in the closed position. This can also be accomplished by providing a certain number of apertures that remain open even as the other apertures close when the movable grill is moved to the closed position. In situations where large quantities of air flow are required, additional ports can be provided that open to the outside of the vehicle. The ports can be covered by movable flaps that are rotatable between a closed position where the port is covered and an open position where the port is uncovered.

Further, the ventilation grill can be adapted for remote operation by the operator. In such an embodiment, the remote actuators can be configured similarly to the actuators 20, 24, 21 and 25 so that grasping and squeezing together one pair opens the vent and grasping and squeezing the other pair closes the vent. The remote actuator can be connected to the stationary and sliding grills by cable mechanisms.

In applications where more than one vent is provided, the plurality of vents can be independently operable so that each vent can be opened or closed independently of the other vents to provide the desired air flow, as conditions warrant. Alternatively, two or more of the vents can be interconnected, by cable mechanisms for instance, so that one set of actuators will operate the interconnected vents in tandem. Furthermore, in an alternative embodiment, the vent need not be attached to the vehicle hood or outer housing, but can also be used as long as it is positioned in the cooling air path. The vent can also be used to control cooling air flow by being positioned in the cooling air exit path.

It is contemplated that the various alternatives and modifications discussed above can be used together in different combinations as desired to provide a vent or vents most suitable for a specific application.

In summary, the adjustable air vents of the present invention are light and durable, non-rusting and easy to make and assemble. The placement of the actuators and the use of them by the operator without tools and while wearing gloves or mittens in frigid temperatures is a significant advance over the prior art.

While this invention has been described in connection with what is presently considered to be the most practical and preferred embodiment, it is to be understood that it is capable of further modifications and is not to be limited to the disclosed embodiment(s), and this application is intended to cover any variations, uses, equivalent arrangements or adaptations of the invention following, in general, the principles of the invention and including such departures from the present disclosure as come within known or customary practice in the art to which the invention pertains.

What is claimed is:

1. An adjustable air vent for a vehicle, comprising:
    a stationary grill adapted to be mounted to the vehicle, the stationary grill having at least one air aperture and an engaging surface; and
    a movable grill adapted to be movably mounted with respect to the stationary grill, the movable grill having at least one air aperture and an engaging surface adapted to engage the engaging surface of the stationary grill, the movable grill movable with respect to the stationary grill from an open position where the ay least one aperture of the stationary grill is aligned with the at least one aperture of the moveable grill to allow air to flow therethrough to a closed position, where the at least one aperture of the stationary grill is not aligned with the at least one aperture of the moveable grill to reduce the flow of air through the vent, the movable grill including at least one projecting actuator suitable for moving the movable grill between the open position and the closed position, wherein the movable grill and the at least one projecting actuator are integrally molded from plastic material.

2. The adjustable air vent of claim 1, further comprising:
    a lock for maintaining a desired position of the movable grill.

3. The adjustable air vent of claim 2, wherein the lock comprises a frictional engagement member for frictionally engaging the movable grill to maintain the desired position of the movable grill.

4. The adjustable air veto of claim 1, wherein the stationary grill includes a plurality of projecting guide posts adapted to position the movable grill and guide movement of the movable grill.

5. The adjustable air vent of claim 4, wherein the stationary grill further includes at least one fastener attached to at least one of the guide posts for engaging the movable grill to secure it to the stationary grill.

6. The adjustable air vent of claim 1, wherein the stationary grill is part of a hood of the vehicle.

7. The adjustable air vent of claim 6, wherein the vehicle is a snowmobile.

8. A snowmobile, comprising:
    a engine for driving the snowmobile;
    an air path from an exterior of the snowmobile to an engine compartment; and
    an adjustable air vent mounted in the air path, the adjustable air vent comprising:
        a stationary grill adapted to be mounted to the vehicle, the stationary grill having at least one air aperture and an engaging surface; and
        a movable grill adapted to be movably mounted with respect to the stationary grill, the movable grill having at least one air aperture and an engaging surface adapted to engage the engaging surface of the stationary grill, the movable grill movable with respect to the stationary grill from an open position, where the at least one aperture of the stationary grill is aligned with the at least one aperture of the moveable grill to allow air to flow therethrough, to a closed positions where the at least one aperture of the stationary grill is not aligned with the at least one aperture of the movable grill to reduce the flow of air through the vent, the movable grill including at least one projecting actuator suitable for moving the movable grill between the open position and the closed position, wherein the movable grill and the at least one projecting actuator are integrally molded from a plastic material.

9. The snowmobile of claim 8, further comprising:
    a lock for maintaining a desired position of the movable grill.

10. The snowmobile of claim 9, wherein the lock comprises a frictional engagement member for frictionally engaging the movable grill to maintain the desired position of the movable grill.

11. The snowmobile of clam 8, wherein the stationary grill includes a plurality of projecting guide posts adapted to position the movable grill and guide movement of the movable grill.

12. The snowmobile of claim 11, wherein the stationary grill further includes at least on fastener attached to at least on of the guide posts for engaging the movable grill to secure it to the stationary grill.

13. The snowmobile of claim 8, wherein the stationary grill is part of a hood of the vehicle.

* * * * *